No. 864,155. PATENTED AUG. 27, 1907.
L. D. CARTER.
WRENCH.
APPLICATION FILED APR. 17, 1905. RENEWED JAN. 23, 1907.
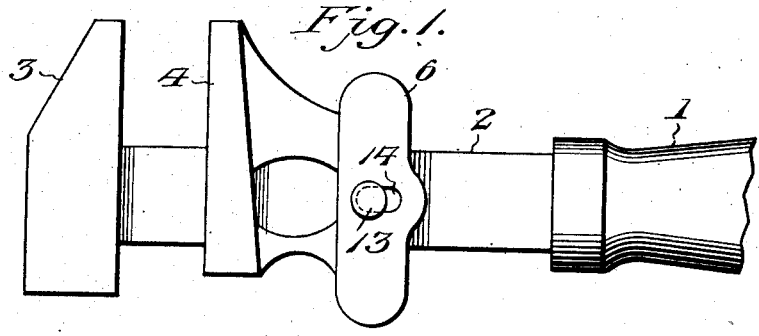
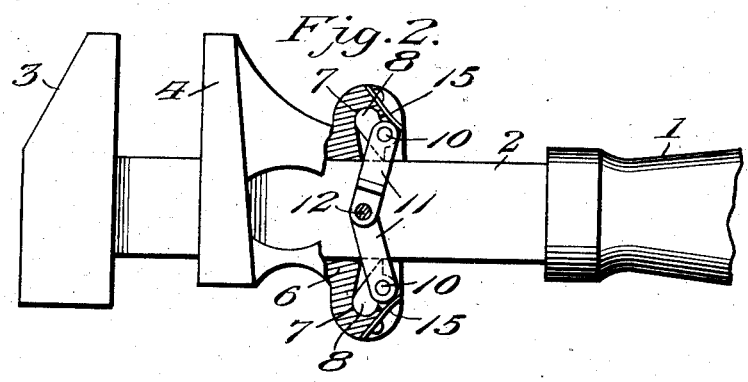
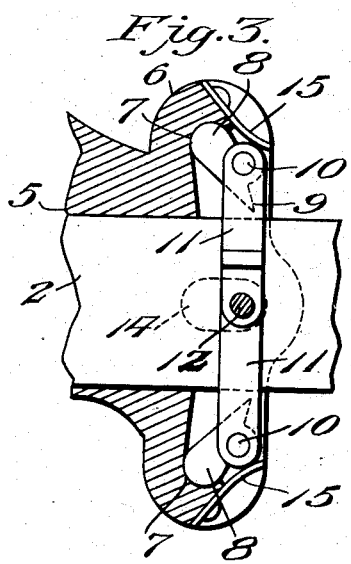
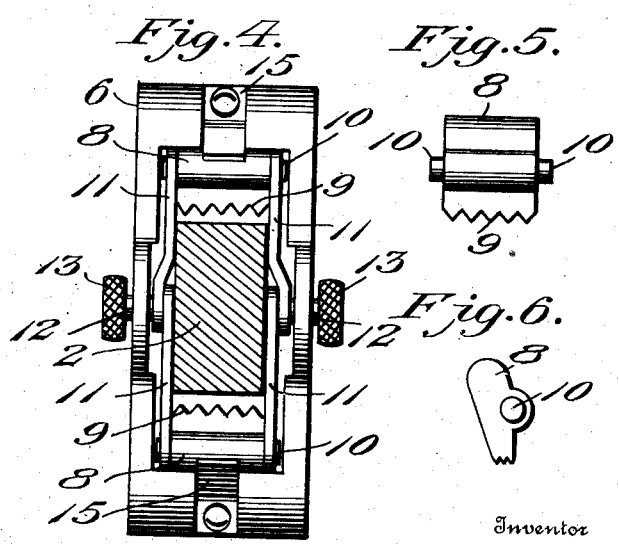
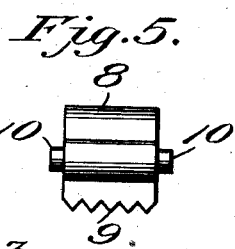
Witnesses
Edwin G. McKee
D. W. Gould.
Inventor
Llewellyn D. Carter
By Victor J. Evans.
Attorney

UNITED STATES PATENT OFFICE.

LLEWELLYN D. CARTER, OF LOS ANGELES, CALIFORNIA.

WRENCH.

No. 864,155.　　　　Specification of Letters Patent.　　　　Patented Aug. 27, 1907.

Application filed April 17, 1905, Serial No. 256,092. Renewed January 23, 1907. Serial No. 353,691.

*To all whom it may concern:*

Be it known that I, LLEWELLYN D. CARTER, a citizen of the United States, residing at Los Angeles, in the county of Los Angeles and State of California, have invented new and useful Improvements in Wrenches, of which the following is a specification.

The invention relates to an improvement in wrenches of that class having a fixed jaw and sliding jaw, arranged to coöperate therewith.

The main object of the invention is the production of means for the simple and convenient locking of the movable jaw in position with relation to the fixed jaw.

The invention in its preferred form will be described in the following specification, with particular reference to the accompanying drawings, in which:

Figure 1 is a side elevation of my improved wrench. Fig. 2 is a similar view with the socket piece sectioned to show the operating mechanism, the dogs being shown in locking position. Fig. 3 is an enlarged sectional detail of the locking mechanism, partly in elevation, the dogs being shown in inoperative or unlocked position. Fig. 4 is a transverse section through the wrench taken just above the locking mechanism, the parts being shown in inoperative position. Fig. 5 is a detail plan of one of the locking dogs. Fig. 6 is a side elevation of the same.

Referring to the drawings my wrench comprises the ordinary handle 1, shank 2, and fixed jaw 3, formed or provided on the outer end of the shank.

4 represents the sliding jaw formed with a central aperture 5 to slidably embrace the shank 2. The lower end of the sliding jaw is formed or provided with a socket piece 6, projected at right angles to the lower end of the sliding jaw and integrally formed adjacent each side face of the shank with a recess or socket 7. Recesses 7 are co-extensive in width with the width of the shank and open toward said shank, as clearly shown in Figs. 2 and 3. A dog 8 is supported in each recess, being rounded on the head to permit movement in the recess without disengagement therefrom. The free ends of the dogs, that is the ends toward the shank, are serrated or formed with teeth as at 9, and each dog is provided with laterally projecting studs 10 preferably offset from the pivotal support of the dogs in the recesses 7. Links 11 are pivotally supported on the studs 10, projecting toward the longitudinal center of the shank and being there connected to finger studs 12, having suitable grips 13. It is understood that the links 11 are arranged in pairs, on each side of the shank 2, the outer terminal of each ink of the pair being connected to one of the dogs, while the inner terminals of both links of the pair are pivotally connected to the finger studs 12. The finger studs are adapted for vertical movement being guided and held in elongated slots 14, formed in the respective faces of the socket piece 6. The links are of such length that when the finger stud is elevated, or at the upper portion of the slot 14, the dogs will be drawn in to contact with the side face of the shank, and when the links are in horizontal alinement with the finger stud at the lower end of the slot 14, the dogs will be swung in their pivotal bearings to disengage their teeth from the side of the shank 2, as shown in Fig. 3.

The lower wall of the socket piece 6 is cut away to communicate with the recesses 7, and springs 15 are secured adjacent said cut-away portion and arranged to bear on the dogs beyond their pivot studs 10, as clearly shown in Figs. 2 and 3. The springs operate to force the dogs into locking engagement with the shank, the reverse operation of the dogs being against the tension of said springs. The links 11 are supported within the walls of the socket piece 6, the finger studs 12 and grips 13, being the only portion of the operating mechanism projecting beyond the face plates of said socket piece.

Assuming the parts as illustrated in Fig. 2, wherein the finger piece 13 has been elevated by the operation of the springs 15, and the dogs forced into engagement with the sides of the shank to lock the sliding jaw, when it is desired to adjust said sliding jaw the finger studs 12 are depressed to aline the links 11, which operates to swing the teeth of the dogs away from engagement with the shank of the wrench, permitting the sliding jaw to be longitudinally adjusted on the shank to the desired position, whereupon by simply releasing the hold upon the finger piece the sliding jaw is automatically locked in the new position. If desired the proximate face of the wrench shank may be roughened for coöperation with the teeth of the dogs. In the longitudinal adjustment of the sliding jaw the operation of the gripping piece to release the dogs will also serve in a practically continuous operation as a medium for the longitudinal movement of the jaw itself, as will be evident.

The wrench described is simple in construction and of few parts and thoroughly efficient in operation.

It will be noted that the dogs are held in the socket piece simply by their loose connection with the recesses therein, and may be readily removed when desired for renewal.

Various changes may be made in the structure described without materially affecting the novel features of my invention, and I contemplate all such changes as within the spirit and scope of my invention.

Having thus described my invention, what I claim as new is:

1. A wrench comprising a shank and a fixed jaw, an adjustable jaw movable on the shank, pivoted dogs carried by the movable jaw and disposed on opposite sides of the shank and adapted to engage the same by their free ends on its said opposite sides, and means connected with said oppositely disposed dogs for operating the same to secure the movable jaw in fixed position on the shank and to release it.

2. A wrench comprising a shank and a fixed jaw, an adjustable jaw movable on the shank, pivoted dogs carried by the movable jaw and disposed on opposite sides of the shank and adapted to engage the same by their free ends on its said opposite sides, and toggle-links connected with said oppositely disposed dogs for operating the same to secure the movable jaw in fixed position on the shank and to release it.

3. A wrench comprising a shank and fixed jaw, an adjustable jaw movable on the shank, pivoted dogs carried by the opposite sides of said adjustable jaw and on opposite sides of the shank, and toggle links connecting said dogs, whereby the dogs may be operated to engage or be disengaged from the shank.

4. A wrench comprising a shank having a fixed jaw, an adjustable jaw movable on the shank, a socket-piece carried by the jaw, pivoted dogs mounted in the socket-piece and arranged to engage the opposite sides of the shank by their free ends, and links connecting the dogs.

5. The combination, with the shank of a wrench, of an adjustable jaw movable thereon, pivoted dogs carried by said jaw on opposite sides of the shank and adapted to engage the opposite sides of the latter by their free ends to secure the jaw in fixed position on the shank or to release the same, and means connected with the pivoted dogs to actuate the same.

6. A wrench comprising a shank having a fixed jaw, a movable jaw slidably mounted on the shank, and socket piece formed integral with the movable jaw, dogs loosely mounted in said jaw and adapted to engage opposite faces of the shank, links connected at their outer terminals to the dogs, and finger studs connecting the inner terminals of the links, and means for automatically forcing said dogs into operative position.

7. A wrench comprising a shank having a fixed jaw, a movable jaw slidably mounted on the shank, and socket piece formed integral with the movable jaw, dogs loosely mounted in said jaw and adapted to engage opposite faces of the shank, links connected at their outer terminals to the dogs, and finger studs connecting the inner terminals of the links, and a spring for forcing said dogs into operative position.

8. A wrench comprising a shank having a fixed jaw, and a movable jaw slidably mounted on the shank, a socket piece formed integral with the movable jaw, dogs loosely mounted in said socket piece and provided with pivot studs, the free ends of the dogs being formed with teeth to engage the shank, and a pair of links connected with the pivot studs at each dog, the inner terminals of one link of each pair being connected by a finger stud, the socket piece being formed with elongated slots to receive said pivot studs, and finger grips to operate said studs.

In testimony whereof, I affix my signature in presence of two witnesses.

LLEWELLYN D. CARTER.

Witnesses:
JOHN L. FLETCHER,
D. W. GOULD.